US012632222B2

(12) United States Patent
Ganguly et al.

(10) Patent No.: US 12,632,222 B2
(45) Date of Patent: May 19, 2026

(54) SYSTEM AND METHOD FOR GENERATING RANDOM BIT STRING IN AN INTEGRATED CIRCUIT

(71) Applicant: Indian Institute of Technology Bombay, Mumbai (IN)

(72) Inventors: Udayan Ganguly, Mumbai (IN); Sunny Sadana, Mumbai (IN); Ashwin Sanjay Lele, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 836 days.

(21) Appl. No.: 16/982,153

(22) PCT Filed: Mar. 20, 2019

(86) PCT No.: PCT/IN2019/050229
§ 371 (c)(1),
(2) Date: Sep. 18, 2020

(87) PCT Pub. No.: WO2019/180743
PCT Pub. Date: Sep. 26, 2019

(65) Prior Publication Data
US 2021/0026604 A1 Jan. 28, 2021

(30) Foreign Application Priority Data
Mar. 21, 2018 (IN) .............................. 201821010427

(51) Int. Cl.
*G06F 7/58* (2006.01)
*G06F 21/73* (2013.01)

(52) U.S. Cl.
CPC .............. *G06F 7/588* (2013.01); *G06F 21/73* (2013.01)

(58) Field of Classification Search
CPC .......................... G06F 7/58–588; G06F 21/73
See application file for complete search history.

(56) References Cited

U.S. PATENT DOCUMENTS

2010/0198896 A1* 8/2010 Hoefler .................. G06F 7/588
708/250
2013/0069131 A1* 3/2013 Kerber .................. H01L 27/06
257/296

(Continued)

OTHER PUBLICATIONS

Prasanth et al., "Analysis of active resistors realized using CMOS technology", in IOSR Journal of VLSI and Signal Processing (IOSR-JVSP), vol. 4, Issue 2, Ver. III, (Mar.-Apr. 2014), pp. 07-11, https://www.iosrjournals.org/iosr-jvlsi/papers/vol4-issue2/Version-3/B04230711.pdf (Year: 2014).*

*Primary Examiner* — Carlo Waje

(57) ABSTRACT

Embodiments herein provide a system and a method for generating a random bit string in an Integrated Circuit. Predefined number of One-time Programmable Memory (OTPM) devices are connected in parallel with each OTPM device configured for producing a random bit-string. Current limiting circuit is connected in series with the at least two OTPM devices. Voltage source supplies a predefined voltage to the at least two OTPM devices for producing a breakdown in one of an OTPM device of the at least two OTPM devices resulting in a broken OTPM device while leaving remaining OTPM devices of the at least two OTPM devices unbroken. The random bit string is generated through at least one of the broken OTPM device and a remaining unbroken OTPM device of the at least two OTPM devices.

12 Claims, 6 Drawing Sheets

(56) References Cited

U.S. PATENT DOCUMENTS

| | | | |
|---|---|---|---|
| 2017/0200508 A1* | 7/2017 | Grigoriev | H04L 9/0866 |
| 2019/0074071 A1* | 3/2019 | Daanen | H10B 69/00 |

\* cited by examiner

102

Device Structure (a)

102 ← S1        S2 → 102

$R_A$        $R_B$

104 ← R

SC

S1, S2 are nominal transistors.
R$A$ and R$B$ are OTP memory device
R is constant resistance.
SC is the sense circuitry (b)        Program (c)        Read

500

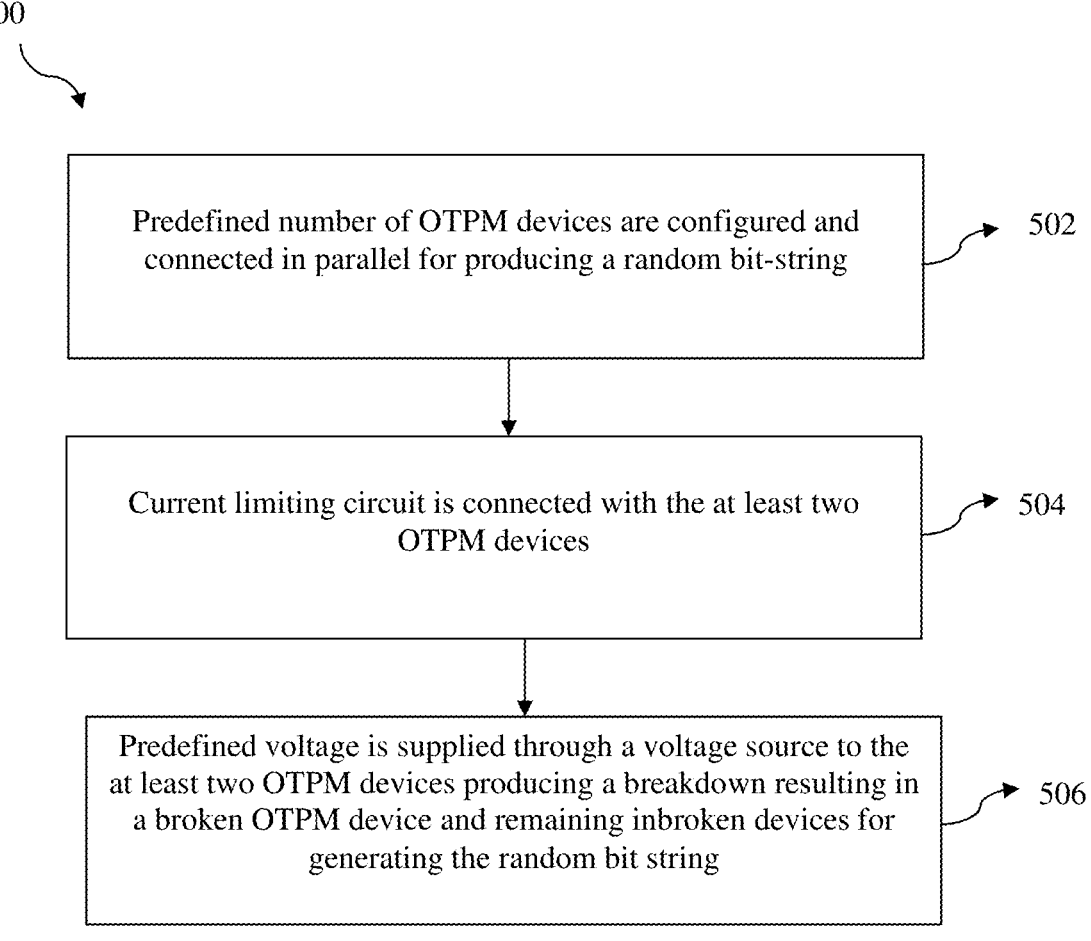

Predefined number of OTPM devices are configured and connected in parallel for producing a random bit-string 502

Current limiting circuit is connected with the at least two OTPM devices 504

Predefined voltage is supplied through a voltage source to the at least two OTPM devices producing a breakdown resulting in a broken OTPM device and remaining inbroken devices for generating the random bit string 506

FIG. 5

SYSTEM AND METHOD FOR GENERATING RANDOM BIT STRING IN AN INTEGRATED CIRCUIT

FIELD OF INVENTION

Present disclosure in general relates to Integrated Circuits (IC's), and more particularly, to generation of random bit strings in the IC's. The present application is based on, and claims priority from PCT application number PCT/IN2019/05022 filed on 20 Mar. 2019 an Indian Application No. 201821010427 filed on 21 Mar. 2018 the disclosure of which is hereby incorporated by reference herein.

BACKGROUND OF INVENTION

Security and authentication has become an integral part in operation of today's smart devices. The smart devices are also implementing user friendly authentication while maintaining minimum financial burden on overall infrastructure. Each smart device is associated with a unique chip identification number for security. Uniqueness depends on randomness of the identification number which is of prime importance, so that security of the device should not be compromised.

In conventional methods, software-based algorithms are widely known for generating cryptographic keys. The cryptographic keys are stored in non-volatile memories (Read Only Memory (ROM), Flash, and alike). Generation of the keys through software-based algorithms may not be random in nature, as the keys are produced through codes or algorithms and may be cracked or compromised.

Furthermore, hardware-based security solutions rely on Physically Unclonable Functions (PUF) for generating keys through stochastic uncontrollable manufacturing variation. PUF based on frequency mismatch in ring oscillator, voltage mismatch between cross-coupled inverters in SRAM, stochastic nature of conducting filaments in RRAM, stochastic switching in MTJ has gained wide popularity, however, even for these listed PUF's, truly unbiased randomness remains a point of concern.

Bias in the PUF's may be corrected through one or more post-processing techniques. Examples of the post-processing may include NBTI aging for SRAM. However, the post-processing techniques are associated with complex algorithms and hence are not easy to implement, due to many hardware related constraints in the smart devices or Internet of Things (IoT) devices.

OBJECT OF INVENTION

The principal object of the embodiments herein is to provide a system and method for generating a random bit string in an integrated circuit.

Another object of the embodiments herein is to provide a configuration of predefined number of One Time Programmable Memory (OTPM) devices connected in parallel for generating the random bit string.

Another object of the embodiments herein is to provide a breakdown of one of an OTPM device of the at least two OTPM device resulting in a broken OTPM device while leaving remaining OTPM devices of the at least two OTPM devices unbroken for generating the random bit string through at least one of the broken OTPM device and a remaining unbroken OTPM device of the at least two OTPM devices.

SUMMARY

Accordingly, embodiments herein provide a system for generating a random bit string in an Integrated Circuit. The system comprises a predefined number of One-time Programmable Memory (OTPM) devices connected in parallel with each OTPM device of the predefined number of OTPM devices configured for producing a random bit-string. The system further comprises a current limiting circuit, connected in series with the at least two OTPM devices, and a voltage source, for supplying a predefined voltage to the at least two OTPM devices, such that the predefined voltage when supplied, produces a breakdown in one of an OTPM device of the at least two OTPM devices resulting in a broken OTPM device while leaving remaining OTPM devices of the at least two OTPM devices unbroken. The random bit string is generated through at least one of the broken OTPM device and a remaining unbroken OTPM device of the at least two OTPM devices.

Accordingly, another embodiment herein provides a method for generating a random bit string in an Integrated Circuit. The method comprises configuring, a predefined number of One-time Programmable Memory (OTPM) devices connected in parallel, with each OTPM device of the predefined number of OTPM devices configured for producing a random bit-string. The method further comprises connecting in series, a current limiting circuit with the at least two OTPM devices and supplying a predefined voltage, through a voltage source to the at least two OTPM devices, such that the predefined voltage when supplied, produces a breakdown in one of an OTPM device of the at least two OTPM devices, resulting in a broken OTPM device while leaving remaining OTPM devices of the at least two OTPM devices unbroken. The random bit string is generated through at least one of the broken OTPM device and a remaining unbroken OTPM device of the at least two OTPM devices.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This system and method is illustrated in the accompanying drawings, throughout which like reference letters indicate corresponding parts in the various figures. The embodiments herein will be better understood from the following description with reference to the drawings, in which:

FIG. 5 illustrates a flow chart for a method for generating a random bit string in an Integrated Circuit (IC), according to the embodiments as disclosed herein.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly, embodiments herein provide a system and a method for generating a random number string in an Integrated Circuit (IC). The system comprises a plurality of One-time Programmable Memory (OTPM) devices connected in parallel. Random number may be generated by supplying a breakdown voltage such that any one of the OTPM device out of the plurality of OTPM devices will breakdown while leaving remaining OTPM devices unbroken. For generating the random number (random bit) with probability of '1' i.e. p=1/n, or p=1−1/n (where n is a predefined number of the OTPM devices and n is greater than 1), n OTPM devices may be connected in parallel. After the breakdown, the broken OTPM device may be assigned a bit '1' and the remaining unbroken OTPM devices may be assigned a bit '0'. The random bit string may be generated by selecting one of the broken OTPM device or the remaining unbroken OTPM devices.

Figure 1:
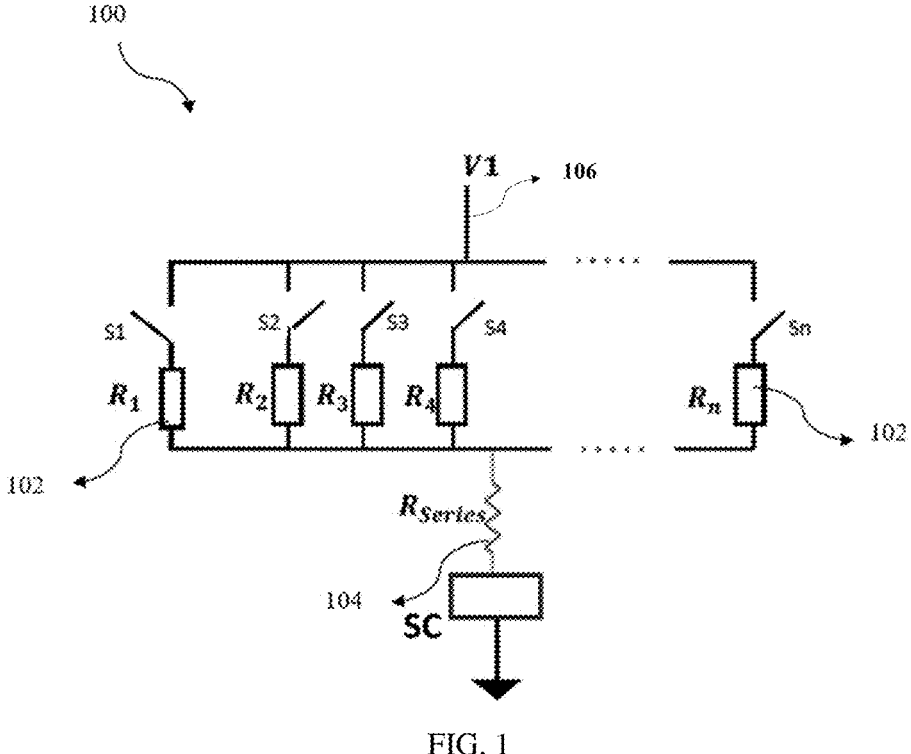
FIG. 1 illustrates a system for generating a random bit string in an Integrated Circuit (IC), according to the embodiments as disclosed herein.

Referring now to the drawings, and more particularly to FIGS. 1 and 5, there are shown preferred embodiments.

According to an embodiment, referring to FIG. 1, a system 100 for generating a random bit string in an Integrated Circuit (IC) is shown. The system 100 comprises a predefined number (n) of One-time Programmable Memory (OTPM) devices 102 connected in parallel. Each OTPM device 102 of the predefined number of OTPM devices 102 is configured for producing a random bit-string (random number). The random bit string further produces a random code.

In FIG. 1, the predefined number of OTPM devices 102 are represented as $R_1, R_2, R_3 \ldots R_n$. The system 100 further comprises a current limiting circuit 104 connected in series with at least two OTPM devices 102 of the predefined number of OTPM devices 102. The current limiting circuit 104 comprises one of a poly resistor, a diffusor resistor, or a transistor switch.

A voltage source 106 is configured for supplying a predefined voltage to the at least two OTPM devices. Switch S1 to Sn comprises standard MOSFET switches. The switches S1 to Sn are in 'ON' state when the system 100 is programmed, to allow breakdown of one of the OTPM device 102. After the breakdown one of the switch from the switches S1 to Sn may be turned on for reading one of the OTPM device 102.

Figure 2:
FIG. 2 illustrates details of a One Time Programmable Memory (OTPM) device in the system of FIG. 1, according to the embodiments as disclosed herein.
Figure 2:
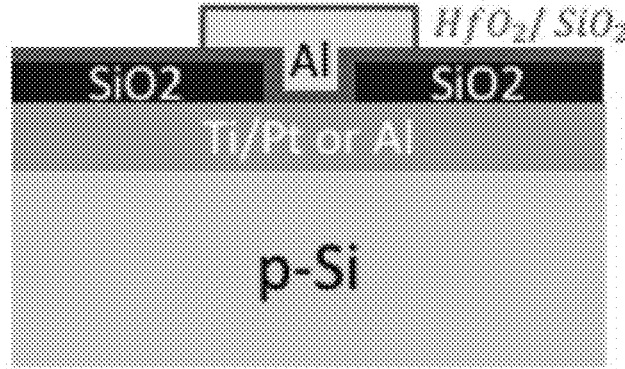

Referring to FIG. 2, detailed configuration of an OTPM device 102 of the predefined number of OTPM devices 102 is shown. In an example, configuration of a single OTPM device 102 is explained herein. The OTPM device 102 may be implemented by using one of a MOSFET or a MOS capacitor in front end or stacked device enabled by 3D integration. The OTPM device 102 comprises an anti-fuse device. The anti-fuse device comprises one of a gate oxide MOSFET or MIM device. The insulator material in MOSFETS may comprise one of a high-K material (potentially for advanced nodes) or SIO2/SiON based (potentially for lower nodes).

The MIM device may comprise one or more metals. The one or more metals comprise one of an Aluminium (Al), a copper (Cu) with thin insulator material like oxide like PECVD SiO2/HfO2/TiO2 sandwiched between two metals. The OTPM device 102 (MIM OTPM device) may comprise first electrode placed on a substrate layer. An isolation layer is deposited on the first electrode. One or more Metal Insulator Metal (MIM) layer is deposited on the isolation layer and the first electrode. A second electrode is placed above the MIM layer.

In an exemplary embodiment, generation of the random number string through the system 100 is explained by considering a scenario of the at least two OTPM devices 102 connected in parallel. It is to be understood that the random number may be generated by connecting the plurality of the OTPM devices 102 by selecting the predefined number 'n'. The predefined number of OTPM devices 102 is selected to achieve a desired rate of probability of breakdown of the one of the OTPM devices 102 of the predefined number of OTPM devices 102. The OTPM device 102 is generated based on a random breakdown event in oxides in one of the MOSFETs or MIM capacitor for generating the random binary code.

The voltage source 106 supplies a predefined voltage to the at least two OTPM devices 102. The predefined voltage is supplied according to a median breakdown voltage value of the system 100. Value of the predefined voltage is at least one of a larger than the median breakdown voltage value, smaller than the median breakdown voltage value or equal to the median breakdown voltage value. The median breakdown voltage refers to a voltage at which 50% of the OTPM devices 102 may breakdown when a varying voltage stress is applied to the OTPM devices 102.

The predefined voltage is supplied to produce a breakdown in one of an OTPM device 102 of the at least two OTPM devices 102. Initially the OTPM devices 102 are in non-conducting state (High Resistance State). When the predefined voltage (constant high voltage stress) is applied to the OTPM devices 102, the breakdown time for each of the OTPM device 102 will be unique and random. The breakdown of the one of the OTPM device 102 is associated with the breakdown time. Therefore, the breakdown of the one of the OTPM device 102 is also random and may not be known a priori. The system 100 thus generates unbiased random binary bits and may withstand variation in voltage supply without affecting bias.

The breakdown results in a broken OTPM device 102 while leaving the remaining OTPM devices 102 of the at least two OTPM devices 102 unbroken. The broken OTPM device 102 will be in conducting state (Low Resistance State) and may be classified as bit '1'. The unbroken OTPM device may be classified as bit '0'. The random bit string is generated through at least one of the broken OTPM device 102 and a remaining unbroken OTPM device 102 of the at least two OTPM devices 102. As shown in the FIG. 1, any one of the OTPM device 102 from the $R_1$ to $R_n$ may become the broken device while the remaining OTPM devices 102 will be unbroken OTPM devices 102.

Once the broken OTPM device 102 is obtained after the breakdown, the current limiting circuit 104 allows a predefined current to flow through the current limiting circuit 104 after the breakdown of the one of the OTPM device 102. The current limiting circuit 104 further causes a potential drop across the current limiting circuit 104 that results in a negligible potential drop across the remaining unbroken OTPM device 102. The current limiting circuit 104 prevents a breakdown of the remaining unbroken OTPM device 102.

The voltage source 106 brings the one of the OTPM device 102 of the at least two OTM devices 102 in the conducting state after the breakdown. The system 100 further comprises a sense circuitry connected at a predefined point for sensing a state of one of the broken OTPM device 102 and the remaining unbroken OTPM device 102 of the at least two OTPM devices 102. In an embodiment, the sense circuitry is connected between the at least two OTPM devices 102. The sense circuitry comprises one of a comparator or a transistor In an example embodiment, still referring to FIG. 1, for generating the random number with controllable bias the predefined voltage (high voltage stress) is applied to the "n" OTPM devices 102 connected in parallel for a sufficient time. Since the breakdown time is random and unique for each of the OTPM device 102 connected in parallel, therefore, out of the "n" OTPM devices only one of the OTPM device will breakdown first. The breakdown will then reduce a voltage difference across the "n" OTPM devices 1-2. Since the voltage is reduced across the n OTPM devices 102, there will not be any further breakdown due to the applied predefined voltage as voltage will get reduced across the parallel connection of the OTPM devices 102.

In an embodiment, the selection of the predefined number of the OTPM devices 102 is explained. The predefined number of OTPM devices 102 is selected to achieve a desired rate of probability of breakdown of the one of the OTPM devices 102 of the predefined number of OTPM devices.

Figures 3A, 3B, 3C:
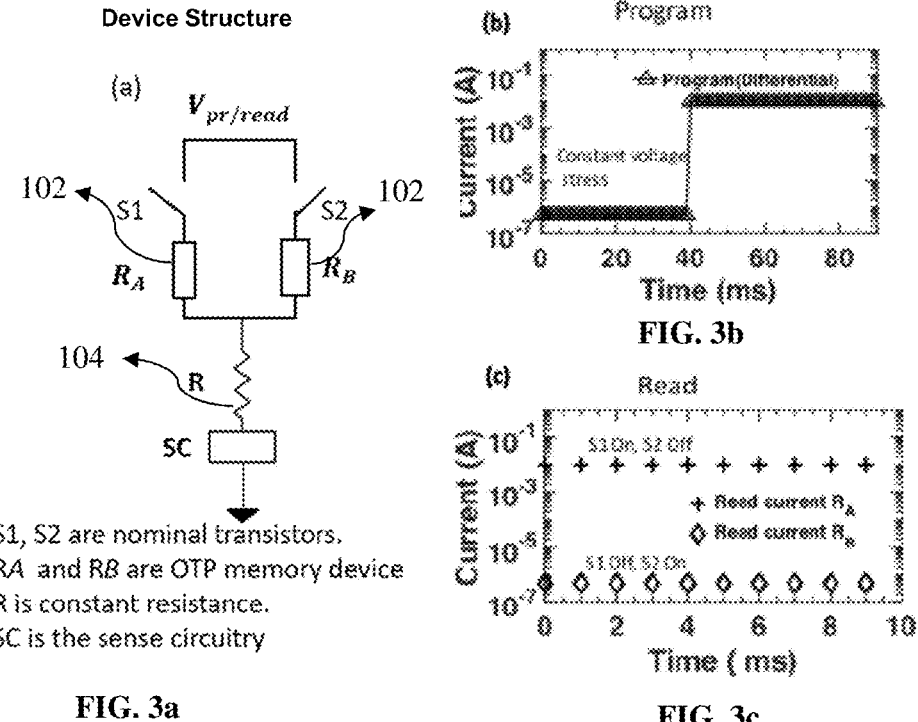
FIG. 3a illustrates the system with two OTPM devices connected in parallel for generating the random bit string, according to the embodiments as disclosed herein.
FIG. 3b illustrates program current verses time plot for the system of FIG. 3a, according to the embodiments as disclosed herein.
FIG. 3c illustrates a plot of read current for the two OTPM devices of the system of FIG. 3a, according to the embodiments as disclosed herein.

In an example, referring to FIG. 3*a*, the system 100 may comprise of the two OTPM devices 102 ($R_a$ and $R_B$) for generating the random number with percentage of ones=50%, R is the constant resistor connected in series (current limiting circuit 104) and S1 and S2 are nominal transistors. The predefined voltage may be applied across the two OTPM devices connected in parallel. Since, the system 100 comprises only the two OTPM devices 102, a probability of breakdown of one of the OPTM device after the predefined voltage is applied will be 50% (1/n, here n=2). Out of the two OTPM devices, a leftmost OTPM device may be read by applying a read voltage (much lower than program voltage or the median breakdown voltage of the system 100) for generating the random number. For reading the leftmost device shown in FIG. 3*a*, Switch S1 (nominal transistor) may be turned on and switch S2 (nominal transistor) may be turned off. FIG. 3*b* illustrates a program current (median breakdown voltage of the system 100) verses time plot for the system 100 of FIG. 3*a*. FIG. 3*c* illustrates read current for the OTPM devices $R_A$ and $R_B$.

For generating the random number with percentage of ones=100/n, the n OTPM devices 102 may be connected in parallel. For n=3, the probability of breakdown for the leftmost OTPM device is ⅓, for n=4 the probability of breakdown for the leftmost OTPM device is 25% and so on. Similarly, by increasing the predefined number 'n' by 1 from 2 to 10, the random number may be generated with percentage of the breakdown probability (probability of 1) varying from 50%, 33.33%, 25%, 20%, 16.66%, 14.28%, 12.5%, 11.11%, and 10%.

In yet another example, for generating the percentage of the breakdown probability to be greater than 50% probability, the complement of the number may be taken to achieve a probability of 1 to be 80%. The predefined number may be taken 5 and the 5 OTPM devices may be connected in parallel. Out of the 5 OTOM devices, the probability of breakdown for one OTPM device by applying the predefined voltage will be 20% and the probability for the OTPM devices of not being broken will be 80% i.e. percentage of zeros=80%. Therefore, the complement will be 80% for percentage of ones.

Figures 4A, 4B:
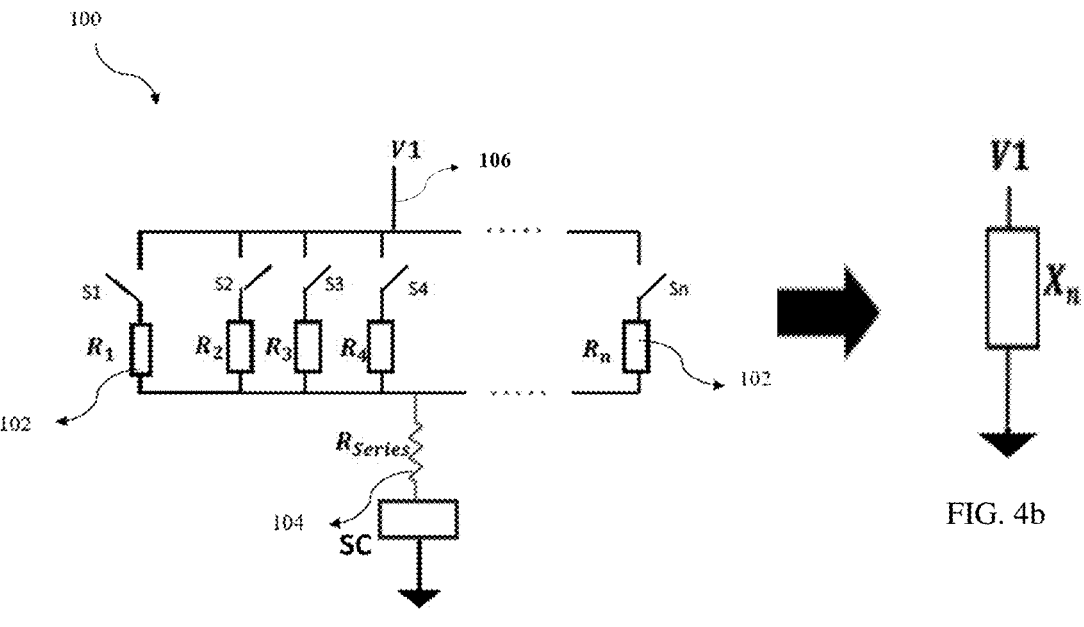
FIG. 4a illustrates a set of 'n' OTPM devices for a single random bit, according to the embodiments as disclosed herein.
FIG. 4b illustrates unit cell for generating the single random bit of FIG. 4a, according to the embodiments as disclosed herein.

Referring to FIG. 4*a*, generation of a single random bit number is shown. For generating "M" bits random number with probability of one, 1 (1 is the conducting state) of "p"=1/n or "p"=1-1/n, "M" (n>1) sets of "n" parallel OTP devices 102 and the current limiting circuit 104 in series may be connected. A unit cell for generating the single random bit of FIG. 4*a* is further shown in FIG. 4*b*.

Figure 4C:
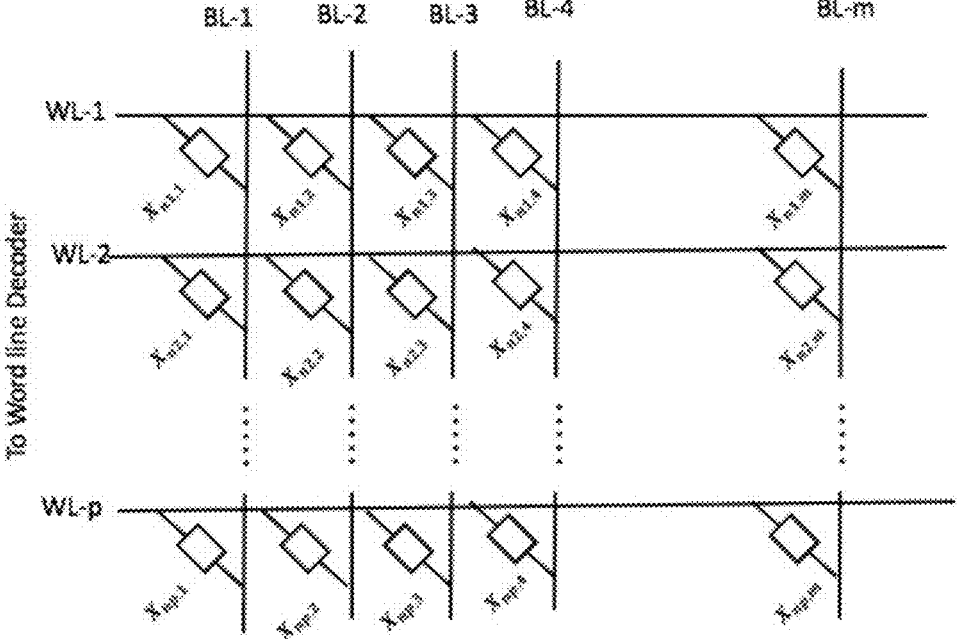
FIG. 4c illustrates a connection of M unit cells of the FIG. 4b for generating 'M' bits random number by connecting plurality of the 'n' OTPM devices of the FIG. 4a, according to the embodiments as disclosed herein.

As shown in FIG. 4*c*, "M" unit cell (shown as $X_{np, 1}$ . . . $X_{np,m}$) is connected for generating the "M" bit random number with probability of ones=1/n. Since there are P word lines, P sequence with 'M' bit strings may be generated, as shown in the FIG. 4*c*. The number of the OTPM devices 102 connected in parallel in the unit cell may be different for different plurality of word lines WL-1 to WL-p and plurality of bit lines (BL-1 to BL-m). During program, the voltage stress is applied through each of the word line of the plurality of Word Lines (WL-1 to WL-p) and the plurality of Bit lines (BL-1 to BL-m) are grounded. During read, a read voltage is applied through one of the Word line. Value of the read voltage is less than the median breakdown voltage value. The read voltage is applied for sensing the state of the one of OTPM devices 102. Through the read voltage, a conducting state or an insulating state of the one of the OTPM device 102 is sensed and the 'M' bit random number is generated based on the sense of the state of the OTPM device 102.

In another embodiment, referring to FIG. 5, a method 500 for generating a random bit string in an Integrated Circuit is shown. The method 500 may be executed through the system 100.

At step 502, the predefined number of the One-time Programmable Memory (OTPM) devices are configured. The OTPM devices 102 are connected in parallel. Each of the OTPM device 102 of the predefined number of the OTPM devices 102 are configured for producing the random bit-string.

At step 504, the current limiting circuit 104 is connected in series with the at least two OTPM devices.

At step 506, a predefined voltage is supplied through the voltage source to the at least two OTPM devices 102. The predefined voltage when supplied, produces a breakdown in one of the OTPM device 102 of the at least two OTPM devices 102 resulting in the broken OTPM device 102 while leaving remaining OTPM devices of the at least two OTPM devices unbroken. The random bit string is generated through the at least one of the broken OTPM device 102 and the remaining unbroken OTPM device 102 of the at least two OTPM devices 102.

It is to be understood that details of the method 500 are similar to the details of the system 100 are not repeated for the sake of brevity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for generating a random bit string in an Integrated Circuit, the system comprising:
   a predefined number of One-time Programmable Memory (OTPM) devices connected in parallel, wherein the predefined number of OTPM devices generates an unbiased random bit string when two OTPM devices are connected in parallel, and a biased random bit string when more than two OTPM devices are connected in parallel, and wherein a degree of bias increases with a number of parallel-connected OTPM devices;
   a current limiting circuit, connected in series with the predefined number of OTPM devices;
   a voltage source, for supplying a predefined voltage to the predefined number of OTPM devices to produce a breakdown in one OTPM device of the predefined number of OTPM devices, resulting in the breakdown of the one OTPM device being random and not known a priori while leaving remaining OTPM devices of the predefined number of OTPM devices unbroken, wherein the breakdown of the one OTPM device is associated with a breakdown time, resulting in generation of the unbiased random bit string when the two OTPM devices are connected in parallel, and the biased random bit string when the more than two OTPM devices are connected in parallel,
   wherein the current limiting circuit is configured to:
      allow a predefined current to flow through the current limiting circuit after the breakdown of the one OTPM device;
      cause a potential drop across a resistor resulting in a negligible potential drop across the remaining unbroken OTPM devices of the predefined number of OTPM devices; and prevent a breakdown of the remaining unbroken OTPM devices of the predefined number of OTPM devices, wherein each OTPM device of the predefined number of OTPM devices comprises:
   a first electrode placed on a substrate layer;
   an isolation layer deposited on the first electrode;
   one or more Metal Insulator Metal (MIM) layers deposited on the isolation layer and the first electrode; and
   a second electrode placed above the one or more MIM layers.

2. The system as claimed in claim 1, wherein the breakdown time of the one OTPM device of the predefined number of the OTPM devices is unique and random.

3. The system as claimed in claim 1, wherein the predefined voltage is supplied according to a median breakdown voltage value of the system, wherein the predefined voltage being at least one of greater than, less than, or equal to the median breakdown voltage value.

4. The system as claimed in claim 3, wherein the system is capable of withstanding variations in voltage supply without affecting randomness of the biased bit random string or the unbiased bit random string.

5. The system as claimed in claim 1, wherein the predefined number of OTPM devices are anti-fuse devices, wherein the anti-fuse devices comprises one of a gate oxide Metal-Oxide-Semiconductor Field-Effect Transistor (MOSFET) or a Metal Insulator Metal (MIM) device.

6. The system as claimed in claim 1, wherein the voltage source is configured to:
   bring the one OTPM device of the predefined number of OTPM devices in a conducting state after random breakdown and is classified as bit '1', and the remaining unbroken OTPM devices of the predefined number of OTPM devices being classified as bit '0', wherein the predefined number of OTPM devices are initially in a non-conducting state.

7. The system as claimed in claim 1, wherein the current limiting circuit comprises one of a poly resistor, or a diffusion resistor.

8. The system as claimed in claim 1, further comprising:
   a sense circuitry connected between the predefined number of OTPM devices for sensing a state of the one OTPM device and the remaining unbroken OTPM devices of the predefined number of OTPM devices thereby generating the unbiased random bit string or the biased random bit string based on the sensed state, and wherein the sense circuitry comprises one of a comparator or a transistor.

9. The system as claimed in claim 1, further comprising:
   a sense circuitry for sensing a state of the one OTPM device and the remaining unbroken OTPM devices of the predefined number of OTPM devices thereby generating the unbiased random bit string or the biased random bit string based on the sensed state, and wherein the sense circuitry comprises one of a comparator or a transistor.

10. The system as claimed in claim 1, wherein the predefined voltage is applied to the predefined number of OTPM devices connected in parallel for a sufficient time, such that only one OTPM device breakdown first, reducing a voltage difference across the predefined number of OTPM devices and preventing further breakdown due to the applied predefined voltage.

11. The system as claimed in claim 1, wherein a probability of a breakdown of any one OTPM device upon application of the predefined voltage is inversely proportional to the predefined number of OTPM devices connected in parallel.

12. A method for generating a random bit string in an Integrated Circuit, the method comprising:

configuring, a predefined number of One-time Programmable Memory (OTPM) devices connected in parallel, wherein the predefined number of OTPM devices generates an unbiased random bit string when two OTPM devices are connected in parallel, and a biased random bit string when more than two OTPM devices are connected in parallel, and wherein a degree of bias increases with a number of parallel-connected OTPM devices;

connecting in series, a current limiting circuit with the predefined number of OTPM devices;

supplying a predefined voltage, through a voltage source to the predefined number of OTPM devices to produce a breakdown in one OTPM device of the predefined number of OTPM devices, resulting in the breakdown of the one OTPM device being random and not known a priori while leaving remaining OTPM devices of the predefined number of OTPM devices unbroken, wherein the breakdown of the one OTPM device is associated with a breakdown time, resulting in generation of the unbiased random bit string when the two OTPM devices are connected in parallel, and the biased random bit string when the more than two OTPM devices are connected in parallel, allow a predefined current to flow through the current limiting circuit after the breakdown of the one OTPM device;

cause a potential drop across a resistor resulting in a negligible potential drop across the remaining unbroken OTPM devices of the predefined number of OTPM devices; and prevent a breakdown of the remaining unbroken OTPM devices of the predefined number of OTPM devices, wherein each OTPM device of the predefined number of OTPM devices comprises:

a first electrode placed on a substrate layer;

an isolation layer deposited on the first electrode;

one or more Metal Insulator Metal (MIM) layers deposited on the isolation layer and the first electrode; and a second electrode placed above the one or more MIM layer.

* * * * *